(12) United States Patent
Runde (10) Patent No.: US 12,552,296 B2
(45) Date of Patent: Feb. 17, 2026

(54) HIGH LATCH FOR A SEAT BACK WITH SLOUCH LOCKING FEATURE

(71) Applicant: Magna Seating Inc., Aurora (CA)

(72) Inventor: David M. Runde, Ortonville, MI (US)

(73) Assignee: Magna Seating Inc., Aurora (CA)

( * ) Notice: Subject to any disclaimer, the term of this patent is extended or adjusted under 35 U.S.C. 154(b) by 81 days.

(21) Appl. No.: 18/564,729

(22) PCT Filed: May 31, 2022

(86) PCT No.: PCT/US2022/031530
§ 371 (c)(1),
(2) Date: Nov. 28, 2023

(87) PCT Pub. No.: WO2022/251727
PCT Pub. Date: Dec. 1, 2022

(65) Prior Publication Data
US 2024/0253537 A1    Aug. 1, 2024

Related U.S. Application Data

(60) Provisional application No. 63/194,640, filed on May 28, 2021.

(51) Int. Cl.
*B60N 2/22* (2006.01)
*B60N 2/36* (2006.01)

(52) U.S. Cl.
CPC ........... *B60N 2/2245* (2013.01); *B60N 2/366* (2013.01); *B60N 2/2209* (2013.01)

(58) Field of Classification Search
CPC .............................. B60N 2/2245; B60N 2/366
See application file for complete search history.

(56) References Cited

U.S. PATENT DOCUMENTS

| | | | |
|---|---|---|---|
| 9,616,778 B1 * | 4/2017 | Bates | B60N 2/366 |
| 9,994,129 B1 | 6/2018 | Shirokane | |
| 10,052,977 B2 | 8/2018 | Ruan | |
| 10,202,056 B2 | 2/2019 | Zimmerman, II | |
| 2018/0111514 A1 * | 4/2018 | Ruan | B60N 2/2245 |

FOREIGN PATENT DOCUMENTS

| | | |
|---|---|---|
| DE | 202005019969 | 3/2006 |
| FR | 2789638 | 8/2000 |
| FR | 2868366 | 10/2005 |
| WO | 2013160146 | 10/2013 |
| WO | 2015074136 | 5/2015 |
| WO | 2020154590 | 7/2020 |

* cited by examiner

Primary Examiner — Anthony D Barfield
(74) Attorney, Agent, or Firm — Miller Canfield (57) ABSTRACT

A seat assembly (10) for use in an automotive vehicle comprises a seat cushion (14) adapted to be coupled to a floor of the vehicle, a seat back (12) pivotably coupled to the seat cushion, a striker bar (28) adapted to be fixedly secured to a support wall in the vehicle, a recliner bracket (42) pivotally coupled to the seat back (12), and a latch assembly (66) pivotally coupled to the recliner bracket (42) and slidably coupled to the striker bar (28). Pivotal movement of the recliner bracket (42) relative to the seat back (12) causes the latch assembly (66) to slide along the striker bar (28) and the seat back (12) to pivot relative to the seat cushion (14) between a full recline position and a forward comfort position.

17 Claims, 8 Drawing Sheets

HIGH LATCH FOR A SEAT BACK WITH SLOUCH LOCKING FEATURE

CROSS-REFERENCE TO RELATED APPLICATIONS

This application claims priority to U.S. Provisional Application 63/194,640, filed on May 28, 2021, the disclosure of which is hereby incorporated by reference in its entirety.

BACKGROUND OF THE INVENTION

1. Field of the Invention

The present invention relates to a seat assembly for use in an automotive vehicle. More particularly, the invention relates to a high latch assembly for use on a seat assembly having a seat back pivotably coupled to a seat cushion wherein the seat back is selectively movable between an upright recline position, a forward comfort position, a reclined slouch position, and a fold flat position overlaying the seat cushion.

2. Description of Related Art

Automotive vehicles typically include one or more seat assemblies having a seat cushion and a seat back for supporting a passenger above a vehicle floor. In sedan type or other vehicles, rear seating assemblies are often fixedly secured to the vehicle floor and have limited adjustability due to the limited space within the rear compartment of the vehicle. It is common for these rear seat assemblies to include a seat back coupled to a seat cushion by a pivot assembly for providing selective pivotal folding of the seat back relative to the seat cushion between a use position and a fold flat position overlying the seat cushion to provide additional storage space within the vehicle rear compartment. It is also common to include a recliner assembly operatively coupled between the seat back and the seat cushion to provide selective pivotal adjustment of the seat back between the use position and a rearward reclined position to provide seat occupant comfort. Alternatively, vehicle rear seat assemblies are also known that have a seat back secured to a fixed striker on the vehicle by a high latch. The high latch is selectively decoupled from the fixed striker allowing the seat back to be rotated from an upright position towards a folded position. Certain known seat assemblies are selectively moveable between a use position and a reclined slouch position while the high latch is engaged with the fixed striker.

However, in a sedan type vehicle, space behind the rear seat assembly is typically limited, or not available, to allow sufficient clearance for rearward pivoting and reclining of the seat back relative to the seat cushion. Further, the range of motion of the seat back is limited by the high latch coupled to the fixed striker.

SUMMARY OF THE INVENTION

According to one embodiment, there is provided a seat assembly for use in an automotive vehicle. The seat assembly comprises a seat cushion adapted to be coupled to a floor of the vehicle, a seat back pivotably coupled to the seat cushion, a striker bar adapted to be fixedly secured to a support wall in the vehicle, a recliner bracket pivotally coupled to the seat back, and a latch assembly pivotally coupled to the recliner bracket and slidably coupled to the striker bar, wherein pivotal movement of the recliner bracket relative to the seat back causes the latch assembly to slide along the striker bar and the seat back to pivot relative to the seat cushion between a full recline position and a forward comfort position.

According to another embodiment, there is provided a seat assembly for use in an automotive vehicle. The seat assembly comprises a seat cushion adapted to be coupled to a floor of the vehicle, an adjuster operatively coupled to the seat cushion to selectively slide the seat cushion between an aft position and a fore position, a seat back pivotably coupled to the seat cushion, a striker bar adapted to be fixedly secured to a support wall in the vehicle, a recliner bracket pivotally coupled to the seat back, and a latch assembly pivotally coupled to the recliner bracket and slidably coupled to the striker bar, wherein pivotal movement of the recliner bracket relative to the seat back causes the latch assembly to slide along the striker bar and the seat back to pivot relative to the seat cushion between a full recline position and a forward comfort position, and wherein sliding the seat cushion between the aft position and the fore position causes the seat back to pivot relative to the seat cushion between the full recline position or the forward comfort position and a reclined slouch position.

According to another embodiment, there is provided a high latch for use in a seat assembly in an automotive vehicle wherein the seat assembly has a seat back pivotally coupled to a seat cushion. The high latch comprises a recliner A-bracket, a recliner B-bracket adapted to be fixedly secured to the seat back, a disc recliner operatively coupled between the recliner A-bracket and the recliner B-bracket to pivotally couple the recliner A-bracket to the recliner B-bracket, wherein the disc recliner is selectively repositionable between an unlocked condition wherein the recliner A-bracket is pivotable relative to the recliner B-bracket and a locked condition wherein the recliner A-bracket is pivotally locked to the recliner B-bracket, and a latch assembly pivotally coupled to the recliner A-bracket and adapted to be slidably coupled to a striker bar fixedly secured to a support wall in the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-13 illustrate a seat assembly 10 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
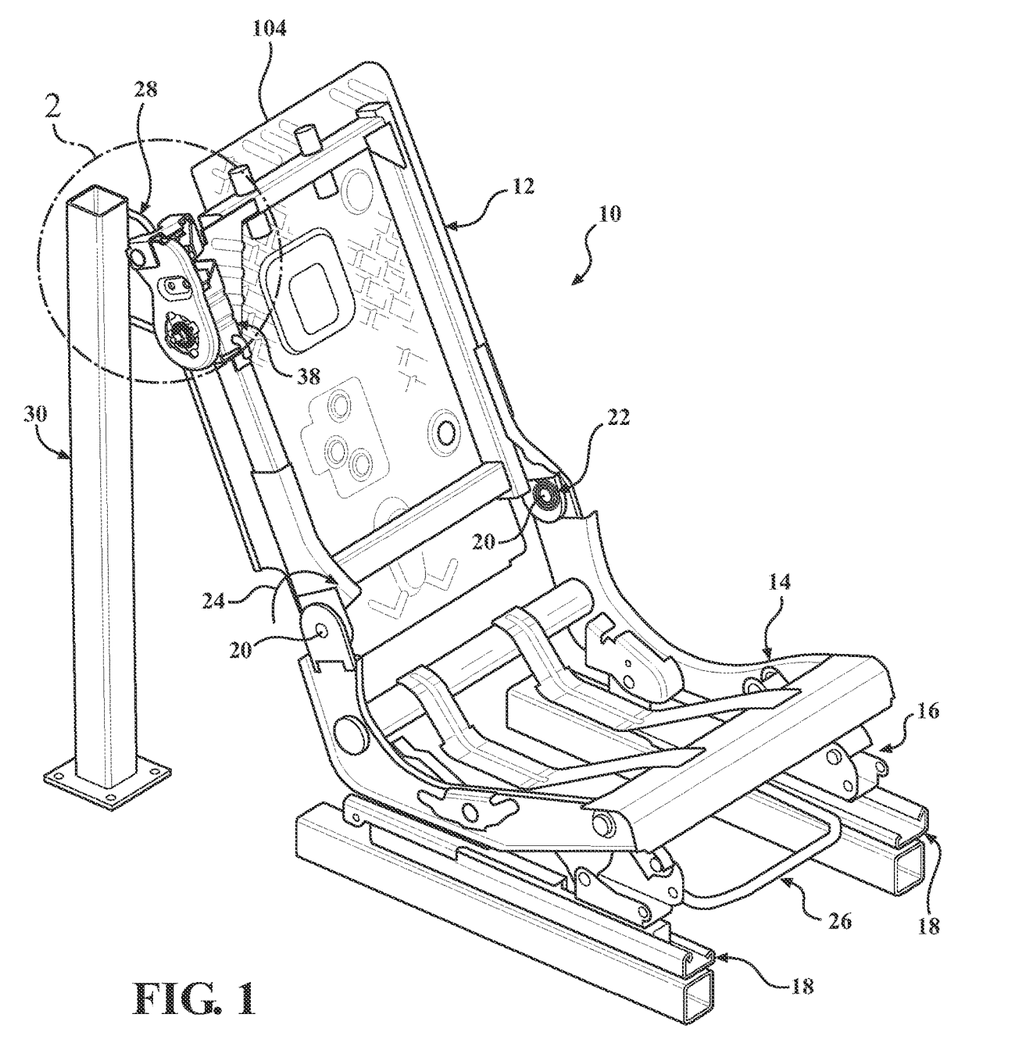
FIG. 1 is a front perspective view of an automotive seat assembly, according to one embodiment of the present invention.
Figure 2:
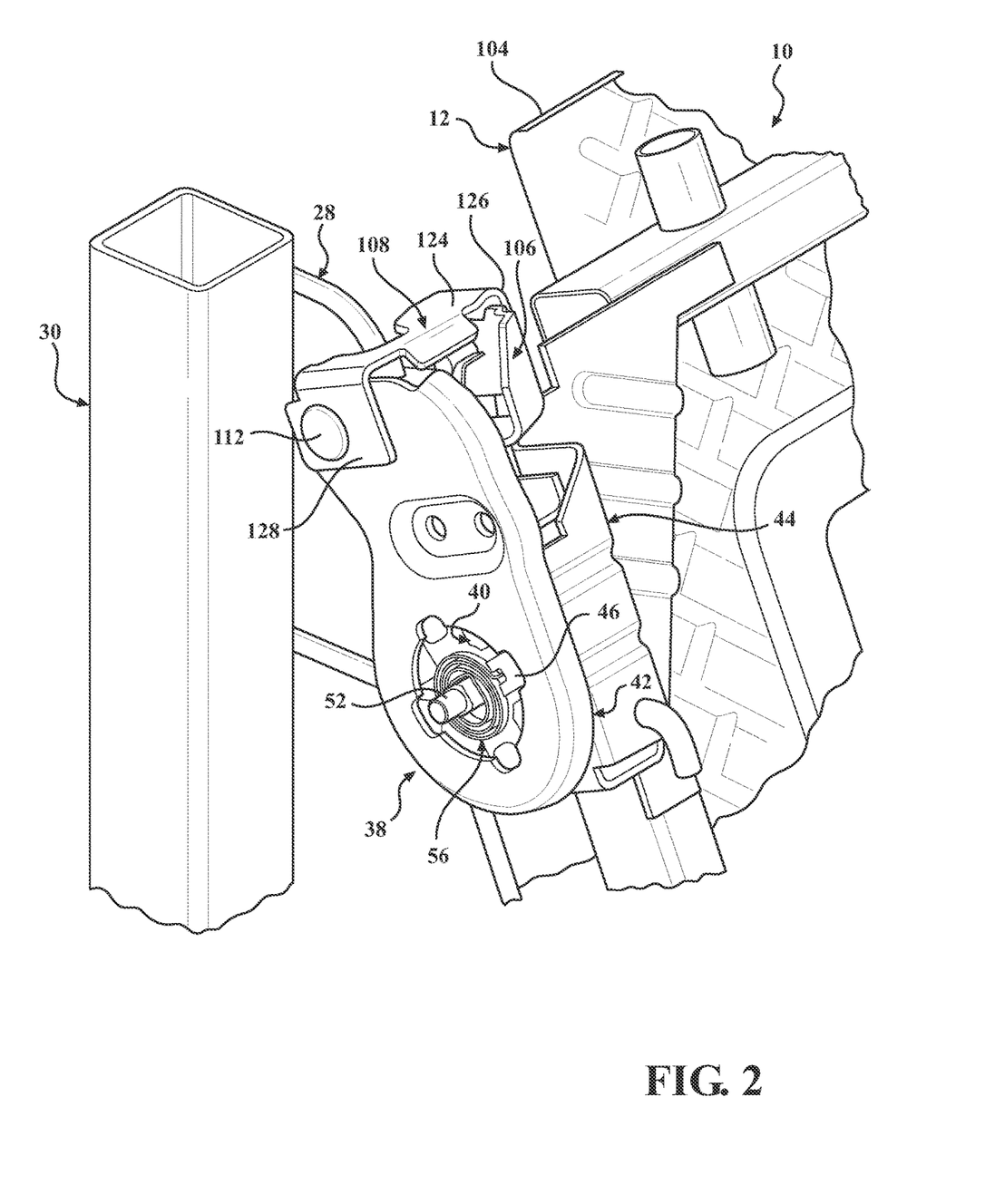
FIG. 2 is an enlarged front perspective view of a high latch (portion 2) from the seat assembly of FIG. 1.

As depicted in FIG. 1, the seat assembly 10 includes a seat back 12, a seat cushion 14, a seat base 16, and a pair of fore/aft adjusters 18. FIG. 1 illustrates the seat assembly 10 in a full reclined position. The seat back 12 is rotatably coupled to the seat cushion 14 by opposing free pivots 20. The seat assembly 10 includes a seat back spring 22 operatively coupled between the seat back 12 and the seat cushion 14 to rotationally biases the seat back 12 in a forward direction (arrow 24) around the free pivots 20. The seat cushion 14 is coupled to the seat base 16 which is fixedly secured to the fore/aft adjusters 18. A towel bar 26 is operatively coupled to the fore/aft adjusters 18 and configured to release a locking mechanism to allow the seat base 16 to be transposable fore and aft along the fore/aft adjusters 18.

Figure 3:
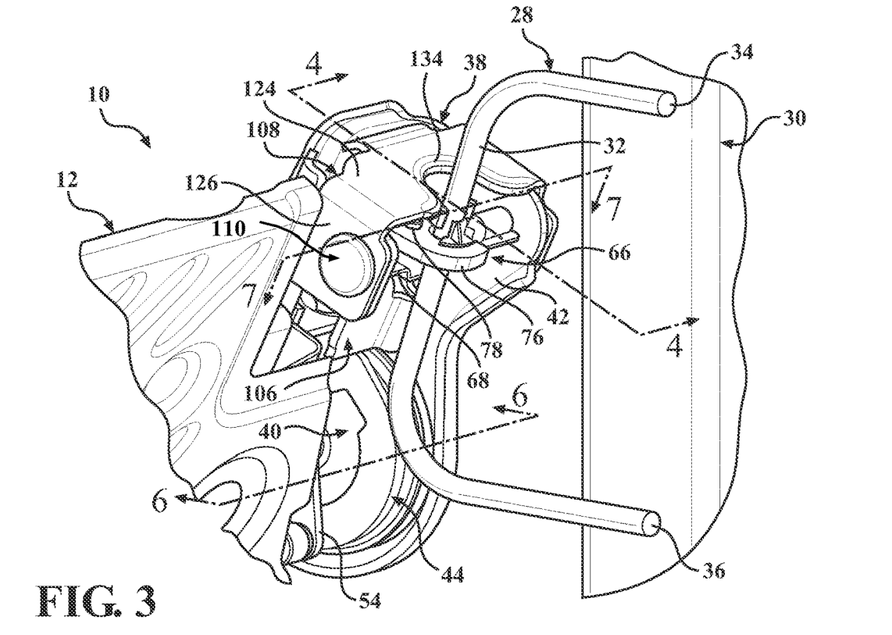
FIG. 3 is a rear perspective view of the high latch of FIG. 2.
Figure 4:
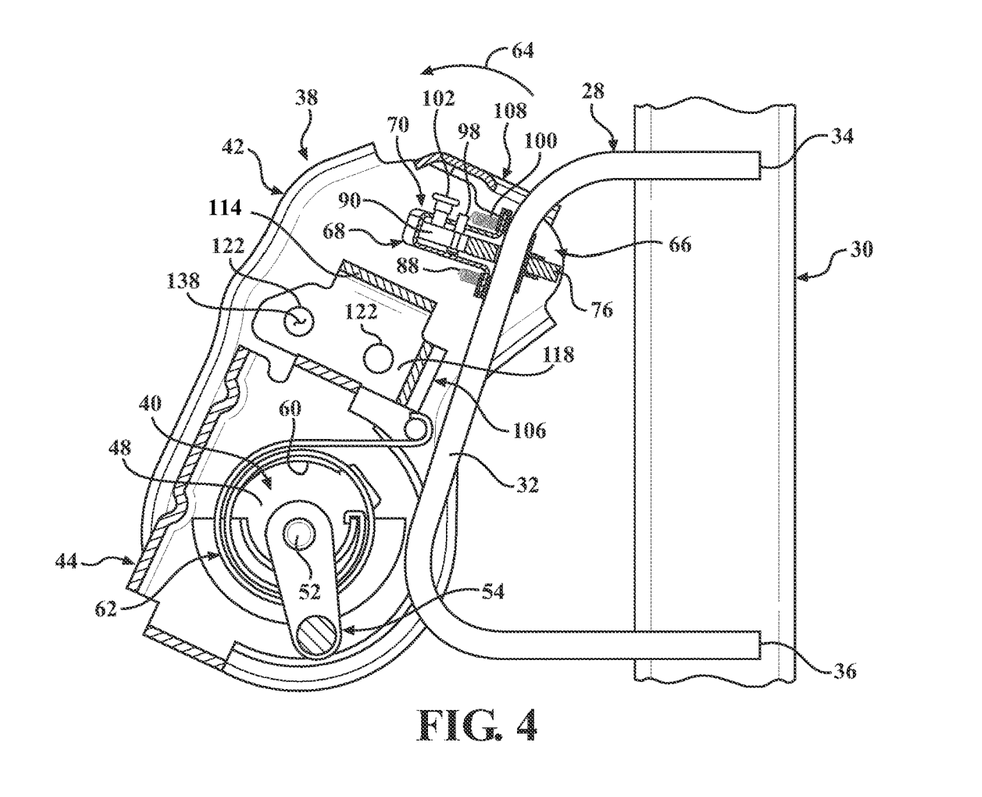
FIG. 4 is a cross-sectional view of the high latch of FIG. 3 taken along line 4-4.

Referring to FIGS. 3 and 4, the seat assembly 10 also includes a striker bar 28 attached to a support wall 30 behind the seat back 12. The striker bar 28 is generally U-shaped and includes a vertically elongated striker portion 32 extending between an upper end 34 and a lower end 36. The upper and lower ends 34, 36 extend in a generally horizontal direction with distal ends fixedly coupled to the support wall 30. It should be appreciated that the shape and structure of the striker bar 28 can vary without departing from the scope of the present invention.

Figure 5:
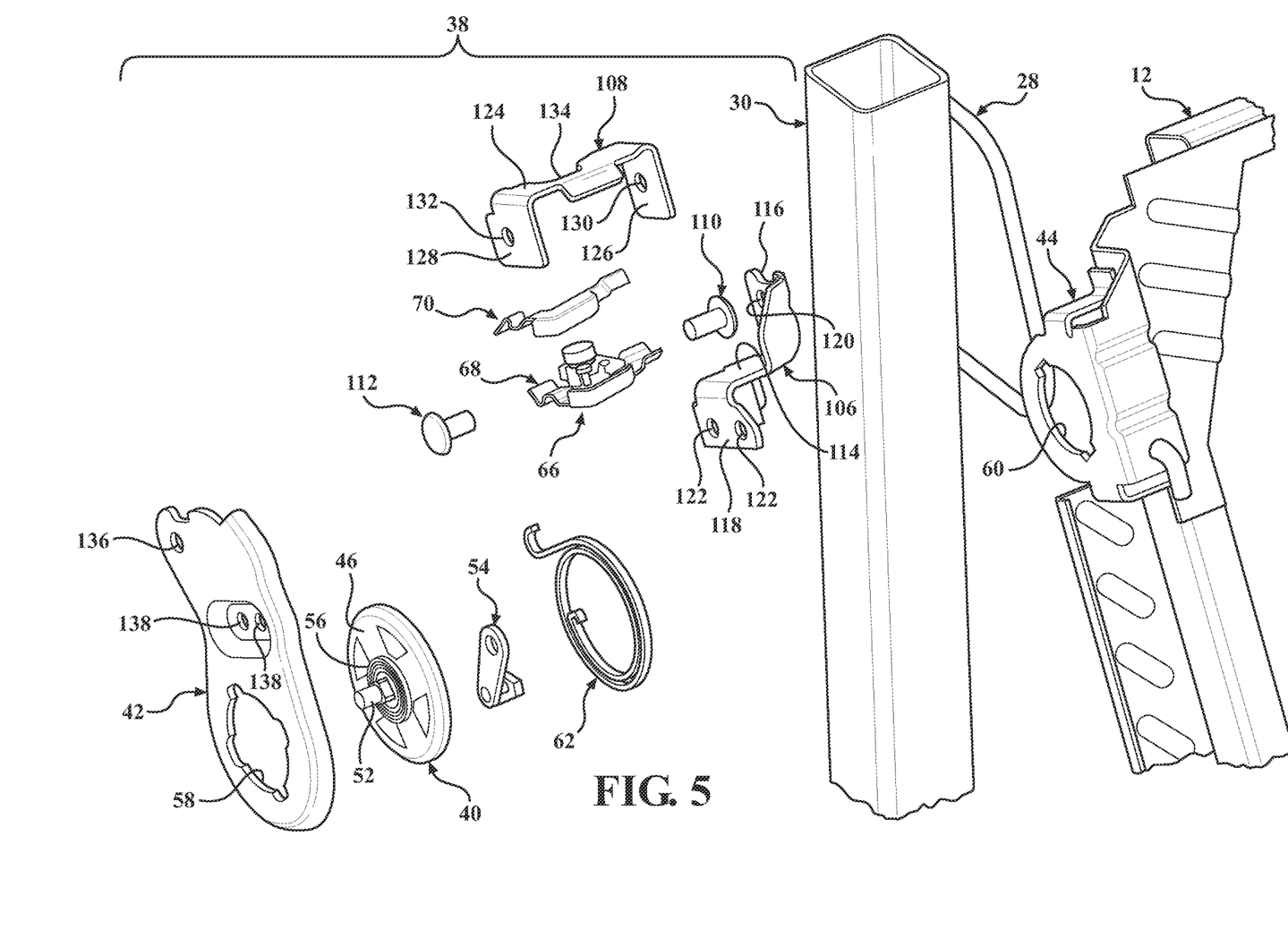
FIG. 5 is an exploded view of the high latch of FIG. 3.
Figure 6:
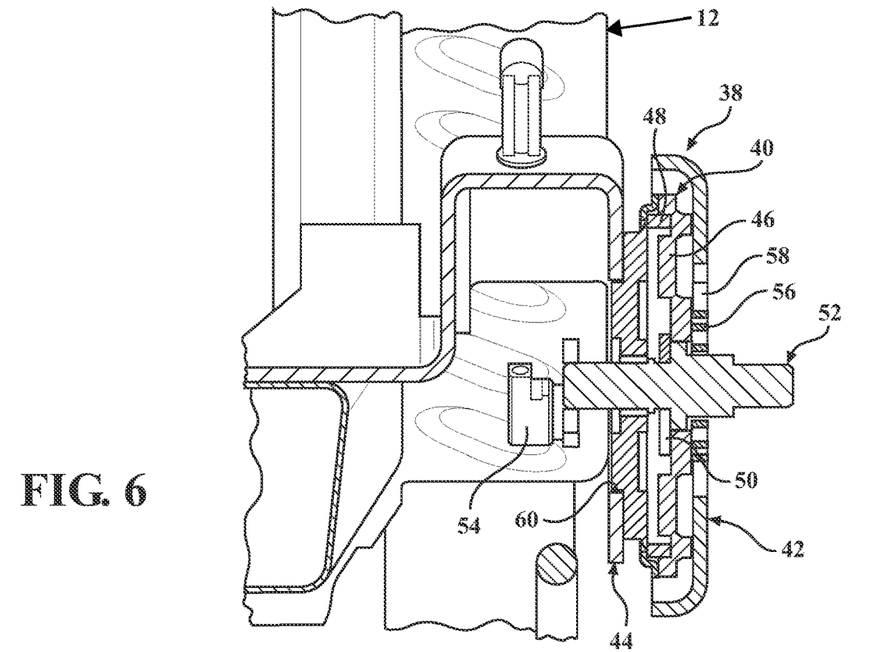
FIG. 6 is a cross-sectional view of the high latch of FIG. 3 taken along line 6-6.

Referring to FIGS. 1-5, the seat assembly 10 further includes a high latch 38 that is pivotably coupled to the seat back 12 and configured to selectively couple to the striker bar 28. Referring to FIGS. 5 and 6, the high latch 38 includes a disc recliner 40 mounted to a recliner A-bracket 42 and a recliner B-bracket 44 to allow the recliner A-bracket 42 to rotate relative to the recliner B-bracket 44. The disc recliner 40 includes a guide plate 46, a tooth plate 48, a cam 50, a recliner shaft 52, recliner pawls (not shown), a recliner release lever 54 and a recliner spring 56. The guide plate 46 is rotatably coupled to the tooth plate 48, the cam 50 is operatively coupled to the recliner pawls, and the recliner pawls (not shown) are operatively coupled to both the guide plate 46 and the tooth plate 48. The cam 50 rotates between a locked condition, where the recliner pawls (not shown) prevent the tooth plate 48 from rotating relative to the guide plate 46, and an unlocked condition, where the recliner pawls (not shown) allow the guide plate 46 to rotate relative to the tooth plate 48. Referring to FIG. 6, the recliner shaft 52 is fixedly coupled to the cam 50 and fixedly coupled to the recliner release lever 54. The recliner spring 56 is operatively coupled between the recliner shaft 52 and the guide plate 46 to bias the cam 50 towards the locked condition. Rotation of the recliner release lever 54 rotates the recliner shaft 52 to rotate the cam 50 into the unlocked condition. When the recliner release lever 54 is released, the recliner spring 56 forces the cam 50 back to the locked condition. An exemplary disc recliner 40 is further described in PCT publication WO/2020/154590, the disclosure of which is hereby incorporated by reference.

The guide plate 46 is mounted into a recliner hole 58 near a lower end of the recliner A-bracket 42. Referring to FIG. 6, the tooth plate 48 is mounted into a laterally-facing mounting hole 60 in the recliner B-bracket 44, which is fixedly coupled to the seat back 12. The recliner A-bracket 42 is rotatable relative to the recliner B-bracket 44 when the disc recliner 40 is in the unlocked condition. In contrast, the recliner A-bracket 42 is rotationally locked to the recliner B-bracket 44 when the disc recliner 40 is in the locked condition. Referring to FIG. 4, a high latch assembly spring 62 is coupled between the recliner A-bracket 42 and the recliner B-bracket 44 to bias the recliner A-bracket 42 in a forward direction (arrow 64).

Figure 7:
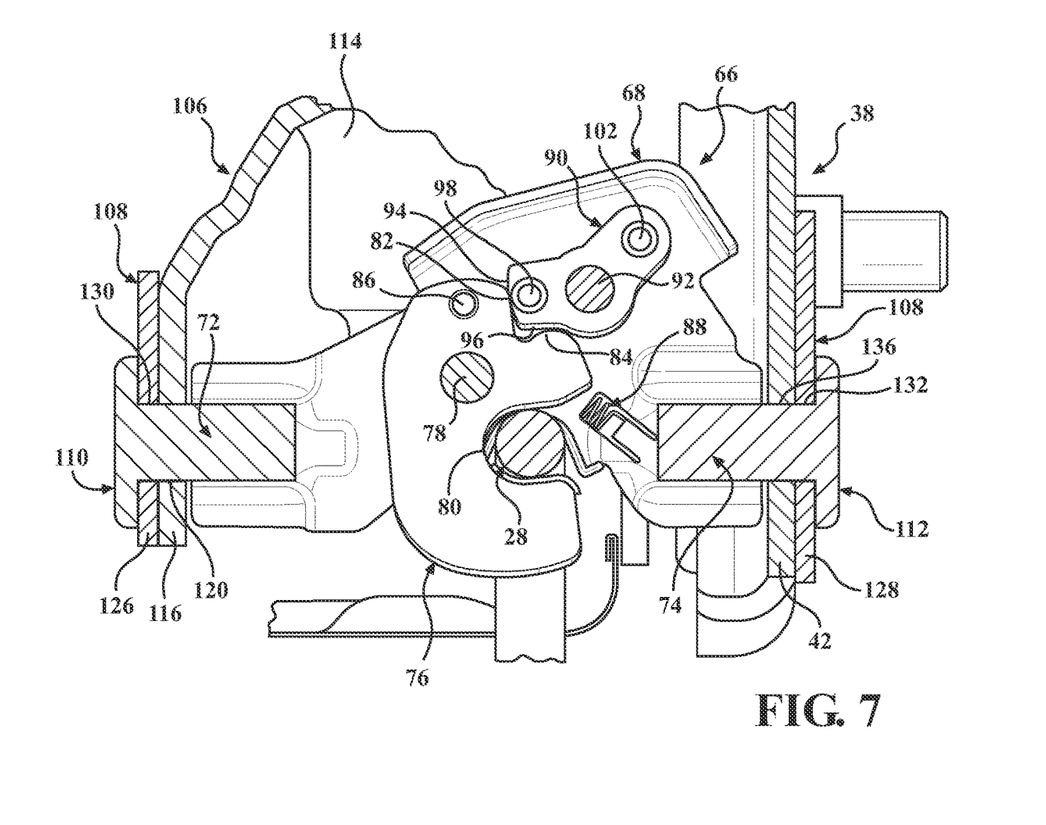
FIG. 7 is a cross-sectional view of the high latch of FIG. 3 taken along line 7-7.

The high latch 38 also includes a pivoting and sliding latch assembly 66 (hereinafter called "latch assembly") configured to latch and/or unlatch the high latch 38 from the striker bar 28. As best shown in FIGS. 4, 5, and 7, the latch assembly 66 includes lower and upper support housings 68, 70) that form inboard and outboard passages 72, 74 on opposite sides of the lower and upper support housings 68, 70. Referring to FIG. 7, the latch assembly 66 also includes a latch hook 76 pivotably coupled to the lower support housing 68 at pivot 78 to move between a sliding latched condition engaged with the striker bar 28 and an unlatched condition released from the striker bar 28. The latch hook 76 includes a C-shaped slot 80 configured to matingly engage with the striker bar 28 when the latch assembly 66 is latched to the striker bar 28. The latch hook 76 also includes a V-shaped notch having a stop surface 82 projecting at an angle from engagement surface 84. A latch post 86 projects from a lower side of the latch hook 76 near the proximal end of the latch hook 76. A latch spring 88 is operatively coupled between the lower support housing 68 and the latch post 86 to bias the latch hook 76 towards the unlatched condition (i.e., clockwise as viewed in FIG. 7). It should be appreciated that the latch post 86 and latch spring 88 could be replaced with a conventional torsion spring without departing from the scope of the present invention.

Also shown in FIG. 7, the latch assembly 66 includes a pawl 90 pivotally coupled to the lower support housing 68 at pivot 92 for releasable engagement with the latch hook 76 to maintain the latch hook 76 in the sliding latched condition. The pawl 90 has a locking surface 94 on a proximal end and a cam surface 96 projecting at an angle from the locking surface 94. The locking and cam surfaces 94, 96 are configured to matingly engage with the stop surface 82 and the engagement surface 84, respectively, when the latch hook 76 is in the sliding latched condition and the pawl 90 is in a locked position shown in FIG. 7. A pawl post 98 projects at generally a right angle from an upper surface of the pawl 90 near the proximal end of the pawl 90. A pawl spring 100 (see FIG. 4) is operatively coupled between the pawl post 98 and the upper support housing 70 to rotationally bias the pawl 90 relative to the pivot 92 in a counterclockwise direction as viewed in FIG. 7. It should be appreciated that the pawl post 98 and pawl spring 100 could be replaced with a conventional torsion spring without departing from the scope of the present invention. A cable post 102 projects at generally a right angle from the upper surface of the pawl 90 near a distal end of the pawl 90. As shown in FIG. 4, the cable post 102 and the pawl post 98 may extend through openings in the upper support housing 70.

A cable extends between the cable post 102 and a fold flat release handle located on a top end 104 (see FIG. 2) of the seat back 12 for actuating and releasing the pawl 90 from locking engagement with the latch hook 76. Actuating the fold flat release handle applies tension to the cable and causes the pawl 90 to rotate to an unlocked position (clockwise as viewed in FIG. 7), which disengages the pawl locking surface 94 from the latch hook stop surface 82 and allows the latch spring 88 to rotate the latch hook 76 to the unlatched condition to decouple the latch assembly 66 from the striker bar 28.

When tension is released from the cable, the pawl spring 100 causes the pawl 90 to rotate towards an engaged condition (counterclockwise) with the pawl cam surface 96 frictionally engaged with the latch hook engagement surface 84. However, the latch spring 88 retains the latch hook 76 in the unlatched condition while the C-shaped slot 80 is disengaged from the striker bar 28. When the striker bar 28 is brought into contact with the C-shaped slot 80, the striker bar 28 applies a load onto the latch hook 76 causing the latch hook 76 to rotate in the counterclockwise direction as viewed in FIG. 7. As the latch hook 76 rotates in the counterclockwise direction, frictional contact between the engagement surface 84 and the cam surface 96 causes the pawl 90 to rotate in the clockwise direction until the locking surface 94 frictionally engages with the stop surface 82. The pawl 90 wedges the latch hook 76 in the sliding latched condition with the striker bar 28.

Referring to FIG. 5, the high latch 38 includes a latch mounting bracket 106, a latch support strap 108, an inboard latch pivot 110 and an outboard latch pivot 112 to mount the latch assembly 66 to the recliner A-bracket 42. The latch mounting bracket 106 includes a central portion 114 extending between an upper tab 116 and a lower tab 118. A pivot hole 120 extends laterally through the upper tab 116, and a pair of mounting holes 122 extends laterally through the lower tab 118. The latch support strap 108 is a generally U-shaped bracket having a cross member 124 extending between inboard and outboard tabs 126, 128. Inboard and outboard pivot holes 130, 132 extend laterally through the inboard and outboard tabs 126, 128, respectively. As best shown in FIG. 3, the cross member 124 includes a C-shaped slot 134 providing clearance for the striker bar 28. The upper support housing 70 is omitted in FIG. 3 for illustrative purposes.

The inboard latch pivot 110 extends through the inboard pivot hole 130 in the inboard tab 126 of the latch support strap 108, through the pivot hole 120 in the upper tab 116 of the latch mounting bracket 106, and into the inboard passage 72 in the latch assembly 66. The outboard latch pivot 112 extends through the outboard pivot hole 132 of the latch support strap 108, through a pivot hole 136 near an upper end of the recliner A-bracket 42, and into the outboard passage 74 in the latch assembly 66.

The mounting holes 122 in the lower tab 118 of the latch mounting bracket 106 are aligned with a pair of mounting holes 138 spaced between the pivot hole 136 and the recliner hole 58 in the recliner A-bracket 42. The latch mounting bracket 106 is fixedly coupled to the recliner A-bracket 42 by mechanical fasteners inserted through the mounting holes 122, 138.

The seat assembly 10 can be repositioned upon demand by the occupant between upright positions including the full recline position (FIGS. 1 and 8), a forward comfort position (FIGS. 9 and 11), and a reclined slouch position (FIG. 12) by adjusting the high latch 38 while the latch assembly 66 is slidably latched to the striker bar 28. In addition, the seat assembly 10 can be repositioned upon demand by the occupant from any one of the upright positions to a fold flat position (FIG. 13) when the high latch 38 is decoupled from the striker bar 28. Further, the seat assembly 10 can be repositioned upon demand by the occupant from the fold flat position to the full recline position.

Figure 8:
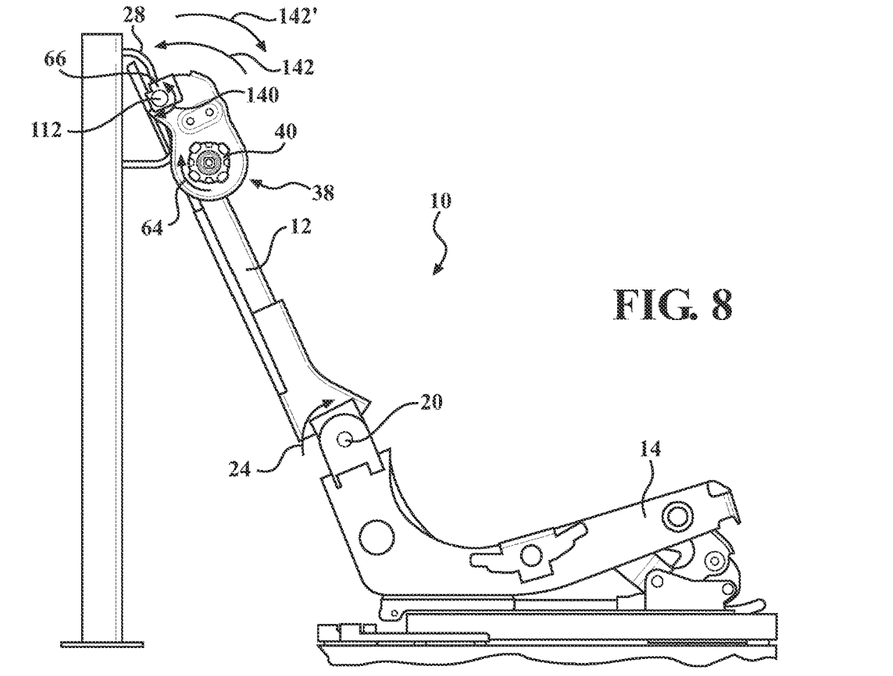
FIG. 8 is a side view of the seat assembly of FIG. 1, showing the seat back in a full recline position.

Referring to FIG. 8, the seat back 12 is initially in the full recline position with the recliner A-bracket 42 in the upright rotational position, the disc recliner 40 in the locked condition, the recliner release lever 54 unactuated, and the fore/aft adjusters 18 in the locked condition. The latch assembly 66 is in the sliding latched condition with an upper portion of the striker bar 28. In addition, the latch assembly 66 is pivotably coupled to the recliner A-bracket 42 (arrow 140) through the latch pivots 110, 112. The disc recliner 40 locks the rotation of the recliner A-bracket 42 relative to the seat back 12 while the disc recliner 40 is in the locked condition. Also, the high latch assembly spring 62 spring-biases the recliner A-bracket 42 in the forward direction (arrow 64) towards the upright rotational position. The seat back 12 is spring-biased forward (arrow 24) relative to the free pivots 20 towards the forward comfort position by the seat back spring 22. Forward rotation of the seat back 12 is restricted by the high latch 38 since the latch assembly 66 is coupled to the striker bar 28 and the disc recliner 40) is in the locked condition.

Figure 9:
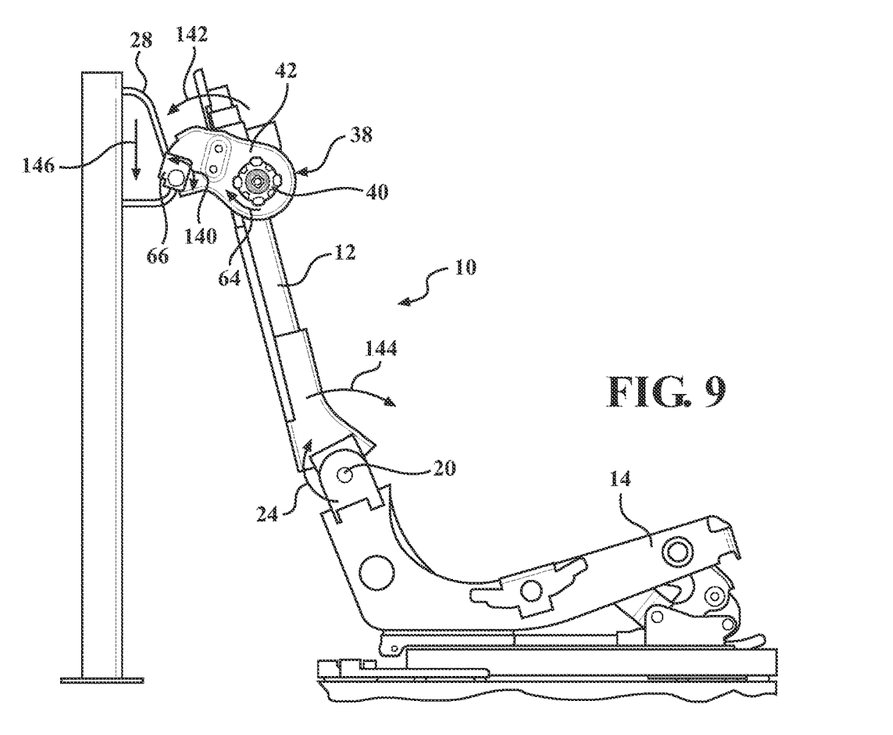
FIG. 9 is a side view of the seat assembly of FIG. 8, showing the seat back in a forward comfort position.
Figure 10:
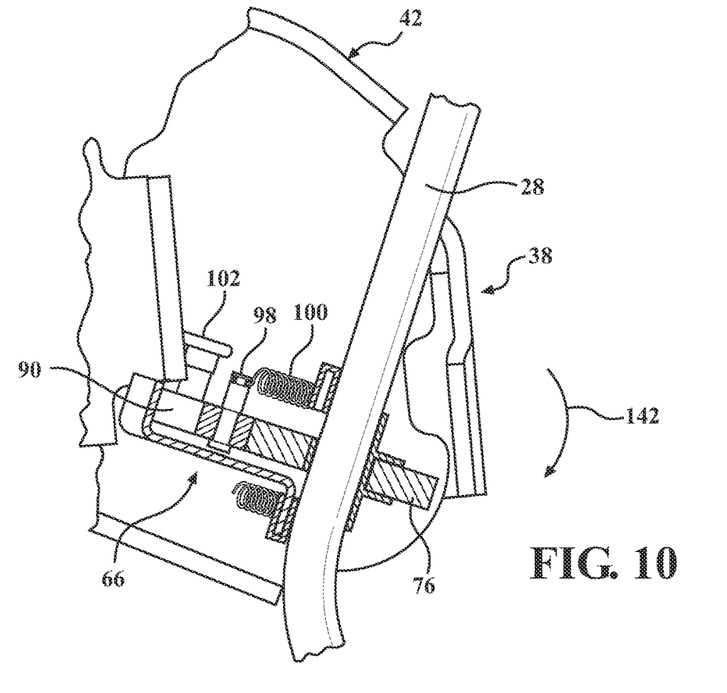
FIG. 10 is a cross-sectional view of a portion of the high latch of FIG. 9 attached to a lower portion of the striker bar.

Referring to FIGS. 9 and 10, to move the seat assembly 10 from the full recline position to the forward comfort position, the occupant adjusts the high latch 38 by actuating an adjustment lever (not shown) operatively coupled to the recliner release lever 54. The actuation of the adjustment lever causes the recliner release lever 54 to rotate the cam 50 to the unlocked condition which unlocks the disc recliner 40. The recliner A-bracket 42 is free to rotate relative to the seat back 12 (arrow 142, 142') while the disc recliner 40 is unlocked. Depicted in FIG. 9, the forward biasing force (arrow 24) of the seat back spring 22 rotates the seat back 12 forward (arrow 144) about the free pivots 20 after the disc recliner 40 is in the unlocked condition. The seat back spring force (arrow 24) overcomes the forward-biasing force (arrow 64) of the recliner spring 56, causing the recliner A-bracket 42 to rotate rearward (arrow 142) and the latch assembly 66 to slide downward (arrow 146) along the striker bar 28 during forward adjustment of the seat back 12. The latch assembly 66 is pivotably coupled to the recliner A-bracket 42 (arrow 140) to ensure that the latch assembly 66 slides down the striker bar 28 during forward adjustment of the seat back 12. The occupant may selectively position the seat back 12 at any angle between the full recline position and the forward comfort position. The occupant releases the adjustment lever when the seat back 12 is in the desired position, causing the disc recliner 40 to lock the recliner A-bracket 42 relative to the seat back 12.

Figure 11:
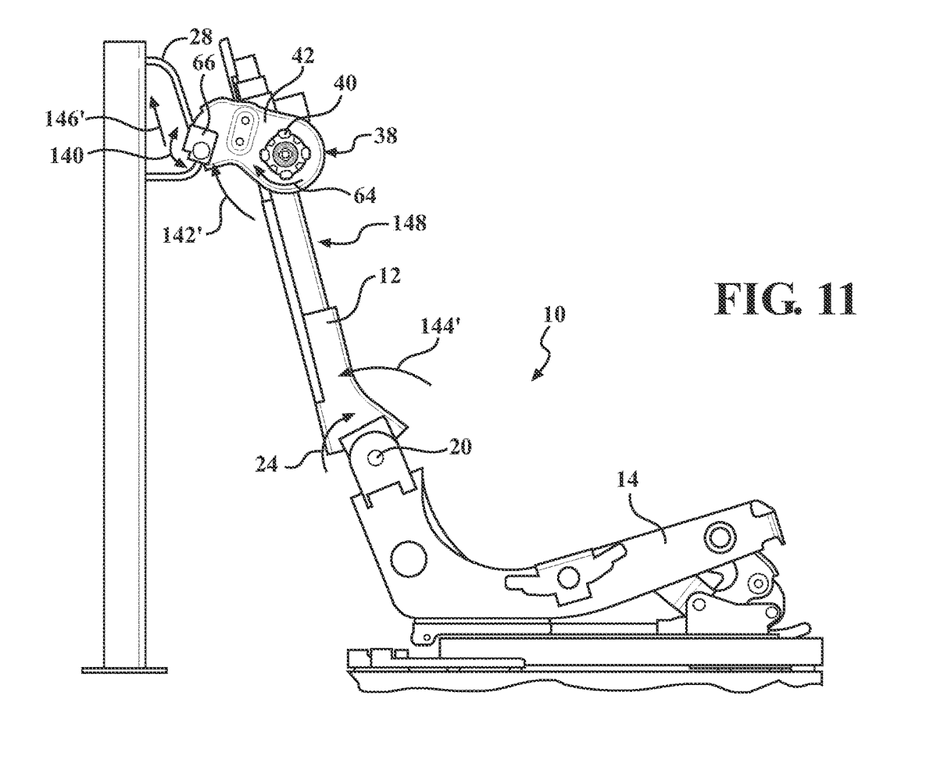
FIG. 11 is a side view of the seat assembly of FIG. 8, showing the seat back in the forward comfort position.

Referring to FIG. 11, to move the seat assembly 10 from the forward comfort position to the full recline position, the occupant actuates the adjustment lever causing the recliner release lever 54 to rotate the cam 50 to the unlocked condition which unlocks the disc recliner 40. Next, the occupant applies rearward loading (arrow 148) on the seat back 12 while the adjustment lever is actuated and the disc recliner 40 is unlocked. The occupant may apply rearward loading (arrow 148) onto the seat back 12 using the occupant's torso or hand, as non-limiting examples. The rearward loading (arrow 148) overcomes the forward-biasing force (arrow 24) of the seat back spring 22 and rotates the seat back 12 rearward (arrow 144') about the free pivots 20.

The forward-biasing force (arrow 64) of the high latch assembly spring 62 in combination with the latch assembly 66 being pivotably coupled (arrow 140) to the recliner A-bracket 42 allows the latch assembly 66 to slide upward (arrow 146') along the striker bar 28 without binding as the recliner A-bracket 42 rotates forward (arrow 142') towards the upright rotational position. The rearward rotation (arrow 144') of the seat back 12 returns the seat assembly 10 to the full recline position. The rearward rotation (arrow 144') of the seat back 12 is limited by a hard stop on the recliner A-bracket 42 and/or the seat back 12. After the seat back 12 is in the full upright position, the occupant releases the adjustment lever repositioning the disc recliner 40 to the locked condition.

Figure 12:
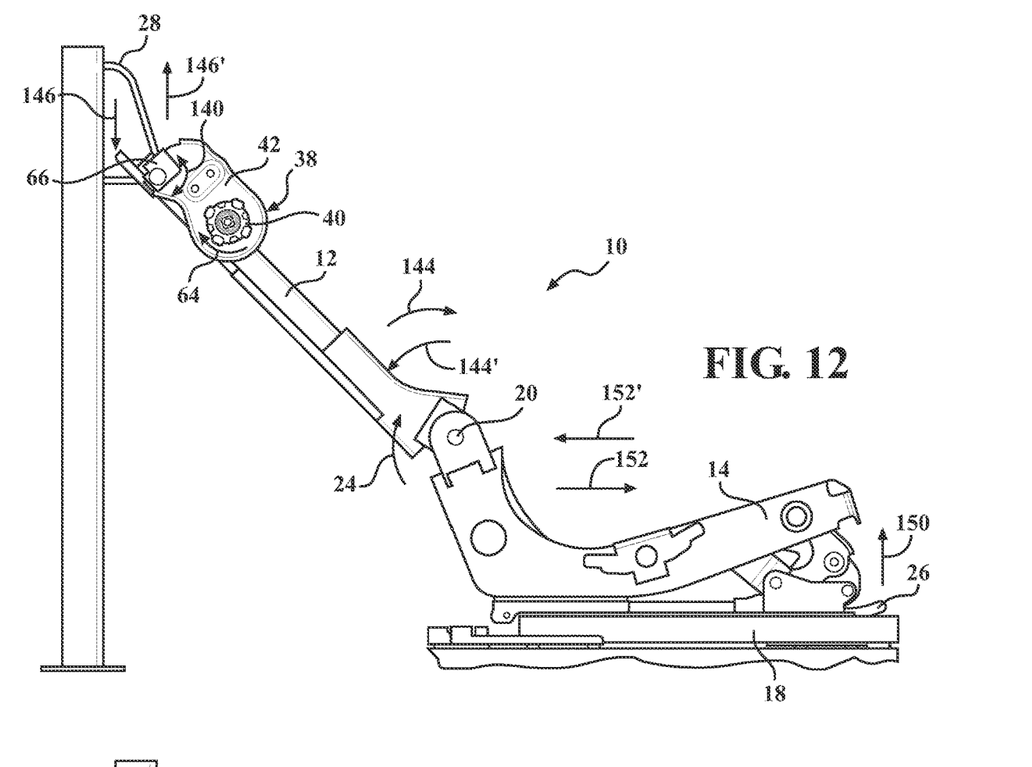
FIG. 12 is a side view of the seat assembly of FIG. 11, showing the seat back in a reclined slouch position.

Referring to FIG. 12, to move the seat assembly 10 from the full recline position to the reclined slouch position, the occupant pulls up on the towel bar 26 (arrow 150) unlocking the fore/aft adjusters 18. While the fore/aft adjusters 18 are unlocked, the occupant slides the seat cushion 14 forward (arrow 152) along the fore/aft adjusters 18 to the desired position. The seat back 12 and the recliner A-bracket 42 remain fixed relative to each other while the seat cushion 14 is being slid forward. The latch assembly 66 slides down the striker bar 28 (arrow 146) allowing the seat back 12 to rotate rearward (arrow 144') about the free pivots 20 in response to the seat cushion 14 sliding forward (arrow 152). The latch assembly 66 pivots relative to the recliner A-bracket 42 as the latch assembly 66 slides down the striker bar 28 to prevent binding during forward adjustment (arrow 152) of the seat cushion 14. When the seat cushion 14 is in the desired position, the occupant releases the towel bar 26 to relock the fore/aft adjusters 18. The occupant may selectively position the seat back 12 at any angle between the full recline position and the reclined slouch position.

To return the seat assembly 10 to the full recline position from the reclined slouch position, the occupant pulls the towel bar 26 upward (arrow 150) causing the fore/aft adjusters 18 to be unlocked. Next, the occupant slides the seat cushion 14 rearward (arrow 152'). The rearward motion (arrow 152') of the seat cushion 14 in combination with the forward-biasing force (arrow 24) of the seat back spring 22 causes the latch assembly 66 to slide upward (arrow 146') along the striker bar 28 and rotates the seat back 12 in the forward direction (arrow 144) about the free pivots 20. The latch assembly 66 pivots as the latch assembly 66 slides along the striker bar 28 to prevent binding of the latch assembly 66 with the striker bar 28 as the seat back 12 rotates. The occupant releases the towel bar 26 locking the fore/aft adjusters 18 in place when the seat assembly 10 is in the desired position.

Figure 13:
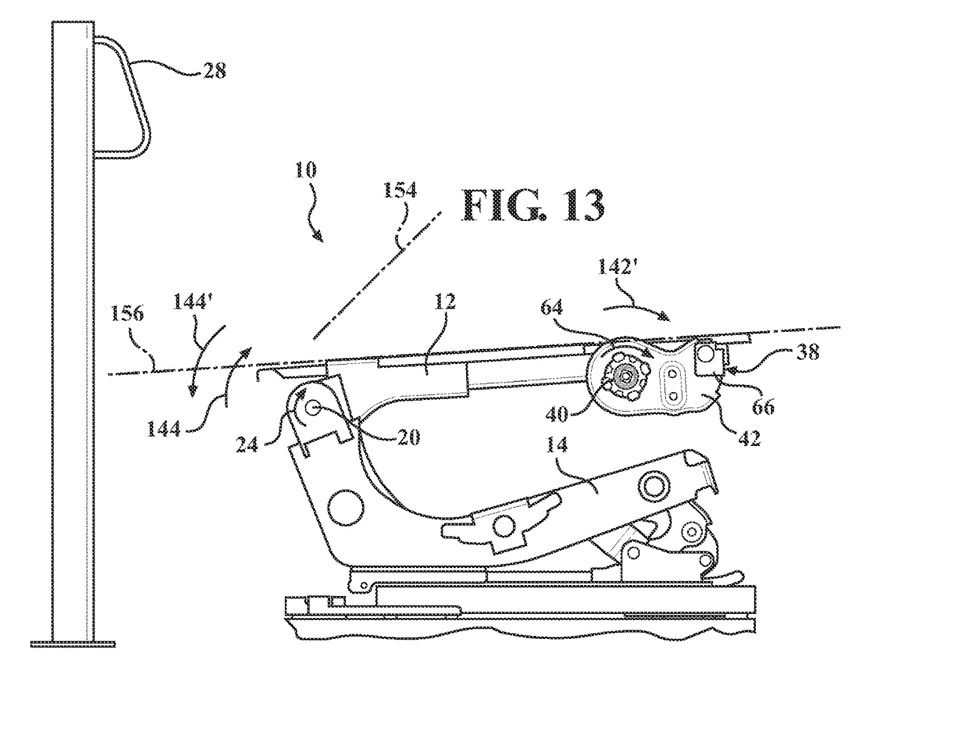
FIG. 13 is a side view of the seat assembly of FIG. 12, showing the seat back in a fold flat position.

Referring to FIG. 13, to move the seat assembly 10 from one of the upright positions to the fold flat position, the occupant actuates the fold flat release handle (not shown) causing the latch hook 76 to rotate away from the striker bar 28 unlocking the latch assembly 66 from the striker bar 28. The forward biasing force (arrow 24) of the seat back spring 22 begins to rotate the seat back 12 forward (arrow 144) about the free pivots 20 after the latch assembly 66 is unlocked from the striker. If the fold-flat function is initiated from the forward comfort position or incremental positions between the full recline and forward comfort positions where the recliner A-bracket 42 is not in the upright rotational position, the disc recliner 40) automatically unlocks when the seat back 12 is rotated forward beyond a preset seat back angle (e.g., angle 154). The forward-biasing force (arrow 64) of the high latch assembly spring 62 then causes the recliner A-bracket 42 to rotate in the forward direction (arrow 142') to the upright rotational position. The seat back 12 rotates forward until the seat back 12 overlays the seat cushion 14. The rotation of the recliner A-bracket 42 to the upright rotational position assures that the seat assembly 10 is below a flat load floor line 156 when the seat back 12 is rotated to overlay the seat cushion 14.

To return the seat assembly 10 to the full recline position from the fold flat position, the occupant rotates the seat back 12 rearward (arrow 144') about the free pivots 20. The disc recliner 40 is automatically relocked when the seat back 12 is rotated rearward (arrow 144') past the exemplary preset seat back angle 154. When the latch hook 76 of the latch assembly 66 is brought into contact with the striker bar 28, additional rearward load (arrow 148 shown in FIG. 11) applied to the seat back 12 causes the latch hook 76 to rotate in the counterclockwise direction (FIG. 7) until the latch hook 76 is in the sliding latched condition with the striker bar 28.

As discussed above, the seat assembly 10 of the present invention includes a high latch 38 having a pivoting and sliding latch assembly 66 and a disc recliner 40. The seat assembly 10 is repositionable between the full recline, forward comfort, and recline slouch positions while the high latch 38 is coupled to the striker bar 28. Further, the high latch 38 can be decoupled from the striker bar 28 allowing the seat assembly 10 to be repositioned from any of the upright positions to a fold flat position.

The invention has been described in an illustrative manner, and it is to be understood that the terminology, which has been used, is intended to be in the nature of words of description rather than of limitation. Many modifications and variations of the present invention are possible in lamp of the above teachings. It is, therefore, to be understood that within the scope of the appended claims, the invention may be practiced other than as specifically described.

What is claimed is:

1. A seat assembly for use in an automotive vehicle, the seat assembly comprising:
    a seat cushion adapted to be coupled to a floor of the vehicle;
    a seat back pivotably coupled to the seat cushion;
    a striker bar adapted to be fixedly secured to a support wall in the vehicle;
    a recliner bracket pivotally coupled to the seat back; and
    a latch assembly pivotally coupled to the recliner bracket and slidably coupled to the striker bar, wherein pivotal movement of the recliner bracket relative to the seat back causes the latch assembly to slide along the striker bar and the seat back to pivot relative to the seat cushion between a full recline position and a forward comfort position.

2. The seat assembly as set forth in claim 1, further comprising a disc recliner operatively coupled between the recliner bracket and the seat back to pivotally couple the recliner bracket to the seat back, wherein the disc recliner is selectively repositionable between an unlocked condition wherein the recliner bracket is pivotable relative to the seat back and a locked condition wherein the recliner bracket is pivotally locked to the seat back.

3. The seat assembly as set forth in claim 2, wherein the latch assembly is operable between a locked condition and an unlocked condition, wherein in the unlocked condition, the latch assembly is able to disengage from the striker bar to allow pivotal movement of the seat back to a fold flat position overlaying the seat cushion.

4. The seat assembly as set forth in claim 3, further comprising a high latch assembly spring operatively coupled between the recliner bracket and the seat back biasing the recliner bracket in a forward direction to an upright position.

5. The seat assembly as set forth in claim 4, wherein when the seat back is pivoted forward past a preset seat back angle, the disc recliner automatically unlocks and the high latch assembly spring pivots the recliner bracket to the upright position.

6. The seat assembly as set forth in claim 5, wherein the seat cushion is selectively slidable between an aft position and a fore position causing the seat back to pivot relative to the seat cushion between the full recline position or the forward comfort position and a reclined slouch position.

7. The seat assembly as set forth in claim 6, wherein the seat back is pivotally coupled to the seat cushion by a free pivot.

8. A seat assembly for use in an automotive vehicle, the seat assembly comprising:
   a seat cushion adapted to be coupled to a floor of the vehicle;
   an adjuster operatively coupled to the seat cushion to selectively slide the seat cushion between an aft position and a fore position;
   a seat back pivotably coupled to the seat cushion;
   a striker bar adapted to be fixedly secured to a support wall in the vehicle;
   a recliner bracket pivotally coupled to the seat back; and
   a latch assembly pivotally coupled to the recliner bracket and slidably coupled to the striker bar,
   wherein pivotal movement of the recliner bracket relative to the seat back causes the latch assembly to slide along the striker bar and the seat back to pivot relative to the seat cushion between a full recline position and a forward comfort position, and
   wherein sliding the seat cushion between the aft position and the fore position causes the seat back to pivot relative to the seat cushion between the full recline position or the forward comfort position and a reclined slouch position.

9. The seat assembly as set forth in claim 8, further comprising a disc recliner operatively coupled between the recliner bracket and the seat back to pivotally couple the recliner bracket to the seat back, wherein the disc recliner is selectively repositionable between an unlocked condition wherein the recliner bracket is pivotable relative to the seat back and a locked condition wherein the recliner bracket is pivotally locked to the seat back.

10. The seat assembly as set forth in claim 9, wherein the latch assembly is operable between a locked condition and an unlocked condition, wherein in the unlocked condition, the latch assembly is able to disengage from the striker bar to allow pivotal movement of the seat back to a fold flat position overlaying the seat cushion.

11. The seat assembly as set forth in claim 10, further comprising a high latch assembly spring operatively coupled between the recliner bracket and the seat back biasing the recliner bracket in a forward direction to an upright position.

12. The seat assembly as set forth in claim 11, wherein when the seat back is pivoted forward past a preset seat back angle, the disc recliner automatically unlocks and the high latch assembly spring pivots the recliner bracket to the upright position.

13. The seat assembly as set forth in claim 12, wherein the seat back is pivotally coupled to the seat cushion by a free pivot.

14. A high latch for use in a seat assembly in an automotive vehicle, wherein the seat assembly has a seat back pivotally coupled to a seat cushion, the high latch comprising:
   a recliner A-bracket;
   a recliner B-bracket adapted to be fixedly secured to the seat back;
   a disc recliner operatively coupled between the recliner A-bracket and the recliner B-bracket to pivotally couple the recliner A-bracket to the recliner B-bracket, wherein the disc recliner is selectively repositionable between an unlocked condition wherein the recliner A-bracket is pivotable relative to the recliner B-bracket and a locked condition wherein the recliner A-bracket is pivotally locked to the recliner B-bracket; and
   a latch assembly pivotally coupled to the recliner A-bracket and adapted to be slidably coupled to a striker bar fixedly secured to a support wall in the vehicle.

15. The high latch as set forth in claim 14, wherein the latch assembly is operable between a locked condition and an unlocked condition, wherein in the unlocked condition, the latch assembly is able to disengage from the striker bar.

16. The high latch as set forth in claim 15, wherein the latch assembly comprises a latch spring biasing the latch assembly towards the unlocked condition.

17. The high latch as set forth in claim 16, further comprising a high latch assembly spring operatively coupled between the recliner A-bracket and the recliner B-bracket biasing the recliner A-bracket in an upright position.

* * * * *